G. W. McKINSTRY & G. H. DAY.
REEL CASE.
APPLICATION FILED AUG. 21, 1912.
1,172,220.
Patented Feb. 15, 1916.
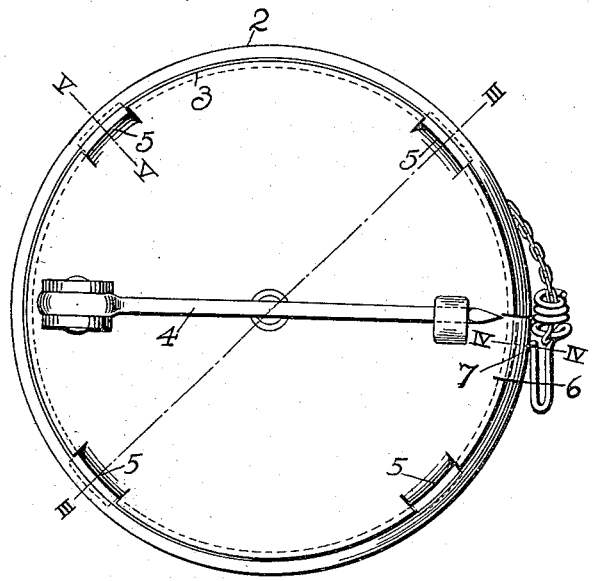
FIG. I
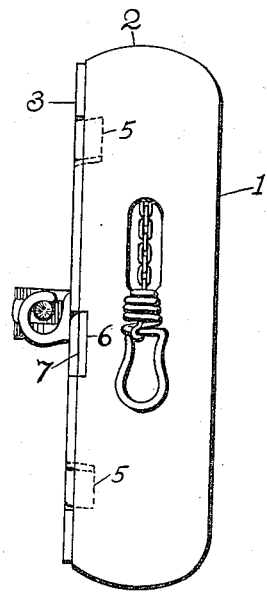
FIG. II
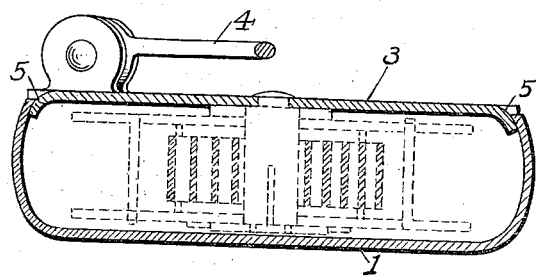
FIG. III
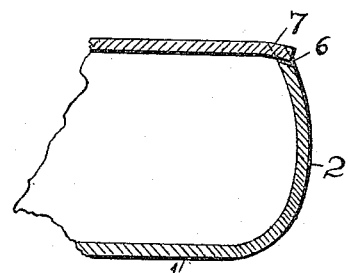
FIG. IV
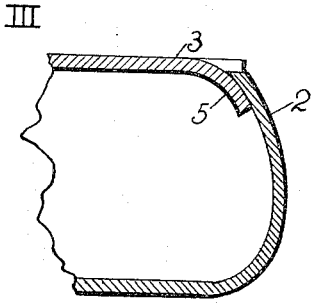
FIG. V
WITNESSES:
Joseph J. Demers
Reginald H. Waters
INVENTORS
G. W. McKINSTRY & G. H. DAY
By
H. H. Stytt & A. H. Parsons
ATTORNEYS

UNITED STATES PATENT OFFICE.

GEORGE W. McKINSTRY AND GEORGE H. DAY, OF SOUTHBRIDGE, MASSACHUSETTS, ASSIGNORS TO AMERICAN OPTICAL COMPANY, OF SOUTHBRIDGE, MASSACHUSETTS, A CORPORATION OF MASSACHUSETTS.

REEL-CASE.

1,172,220.      Specification of Letters Patent.      Patented Feb. 15, 1916.

Original application filed September 24, 1910, Serial No. 583,811. Divided and this application filed August 21, 1912. Serial No. 716,282.

*To all whom it may concern:*

Be it known that we, GEORGE W. McKINSTRY and GEORGE H. DAY, citizens of the United States, residing at Southbridge, in the county of Worcester and State of Massachusetts, have invented certain new and useful Improvements in Reel-Cases, of which the following is a specification.

Our invention relates to improvements in eyeglass reels, the present case being a division from our original application filed September 24, 1910, Serial No. 583,811.

The leading object of the present invention is the provision of an improved form of eyeglass reel case, and more particularly of a reel case in which the front and rear portions thereof may be readily separated or quickly united as desired.

The further object of our invention is the provision of an improved structure by means of which the front and rear of eyeglass reel cases may be detachably connected.

Other objects and advantages of our improved case for an eyeglass reel should be readily apparent by reference to the following description taken in connection with the accompanying drawings, and it will be understood that we may make any modifications in the specific details of construction shown and described within the scope of the appended claims without departing from or exceeding the spirit of our invention.

Figure I represents a bottom plan view of our improved eyeglass reel. Fig. II represents a side view thereof. Fig. III represents a sectional view on the line III—III of Fig. I. Fig. IV represents a sectional view on the line IV—IV of Fig. I, and Fig. V represents a sectional view on the line V—V of Fig. I.

In the drawings, in which similar characters of reference are employed to denote corresponding parts throughout the several views, the numeral 1 designates the top of our improved reel case having the reversely curving peripheral flange 2 forming the intermediate portion of the case, while fitting against the edge of the said flange 2 is the bottom section 3 of our reel case. Said bottom section 3 has suitably secured thereto the pin or attaching device 4, by means of which the reel may be secured to the apparel of the owner thereof.

By reference to the sectional views and particularly to Fig. V of the drawings the reverse curving of the portion 2 of the cover of the reel and the fitting thereagainst of the edge of the bottom plate 3 will be readily apparent.

Hitherto various expedients have been resorted to to secure the two sections of the reel together but in practically every instance the two parts have been so secured as to render detachment or separation thereof when desired extremely difficult. It is the purpose of our invention to facilitate the removal of the cover of the reel to permit of ready access to the working parts of the reel to repair or replace said parts or to adjust the same as may be necessary. To attain this result we strike up from the edge of the plate 3 a plurality of tongues 5 so disposed as to tightly fit against the interior of the flange 2 when the plate 3 is in position resting against the edge of the said flange. It will be understood that ordinarily it would be rather difficult to force all of these ears into engagement with the interior of the flange 2 without bending or buckling of the plate 3. To obviate this difficulty we form in the edge of the flange 2 the notch or recess 6 slightly greater in width than the width of one of the ears or lugs 5. To assemble the reel it is then merely necessary to hook one or two of the ears 5 in engagement with the inturned portion of the flange 2 and then to rotate the plate 3 to bring the other ears into alinement successively with the notch 6. As each of the ears reaches the notch 6 it may be readily pressed forward through said notch or sprung inwardly of the flange, when a slight rotation of the plate will cause the same to engage the interior of the flange 2 and in this manner by rotation of the plate 3 the ears 5 are all brought into position in engagement with the interior of the flange and the cover section thus satisfactorily locked in position on the base plate 3.

To prevent accidental relative rotation of the base and cover sections and thus unlocking of the cover section we preferably form on the base plate 3 the somewhat resilient tongue 7 of size to fit into the notch 6. After the various ears 5 are in correct position we then relatively rotate the cover and base plate until the tongue 7 registers with the notch 6, when the resiliency of said tongue will cause the same to spring into the notch as is most clearly shown in Figs. II and IV, the interlocking of these parts holding the base and cover sections against relative rotation. When it is desired to remove the cover it is merely necessary to spring the tongue 7 out of the notch 6 and then to relatively turn the two parts of the casing until the ears 5 are withdrawn through the notch 6.

From the foregoing description taken in connection with the accompanying drawings the construction of our improved reel case should be readily apparent to all, and it will be seen that we have provided a simple and efficient case for this purpose which may be inexpensively manufactured, which may be readily assembled and which while securely locking the two parts together for ordinary use may quickly and easily be unlocked to permit of disengagement or separation of the parts when it is desired to have access to the interior of the reel or to place a different variety of cover thereon.

We claim:

1. In a device of the character described, a casing comprising a back plate having a plurality of tongues, a cover having a turned edge with a recess therein adapted to receive the tongues and permit them to slip under the edge as the back is rotated, and a keeper tongue on the back plate adapted to slip in the recess and prevent further rotation of the back or cover.

2. A casing for a device of the character described comprising a cover section curving inwardly at the rear, and a back plate fitting against the rear of the cover, said back plate having tongues cut therefrom and bent to frictionally engage the inner face of the cover to secure the parts together, one of said parts having a recess formed therein, and the other part having a tongue fitting into the recess to lock the cover and base plate against relative rotation.

3. In a device of the character described, the combination with a dome like cover section, of a back plate coöperating with said cover section, said back plate being formed with portions over-lapping the edge of the dome like cover section, and with an additional portion extending inwardly away from the back plate and fitting within the cover section, whereby the over-lapping and inwardly projecting portions of the back plate regulate the relative position of the parts, one of said parts having a recess formed in the edge thereof, and the other of said parts having a projecting tongue fitting within the recess to lock the parts against relative rotation, substantially as described.

In testimony whereof we affix our signatures in presence of two witnesses.

GEORGE W. McKINSTRY.
GEORGE H. DAY.

Witnesses:
H. K. PARSONS,
REGINALD H. WATERS.

Copies of this patent may be obtained for five cents each, by addressing the "Commissioner of Patents. Washington, D. C."